United States Patent [19]

Seiger

[11] Patent Number: 4,681,663
[45] Date of Patent: Jul. 21, 1987

[54] BIPOLAR ELECTRODE FORMATION

[75] Inventor: Harvey N. Seiger, Mayfield Heights, Ohio

[73] Assignee: Gould Inc., Rolling Meadows, Ill.

[21] Appl. No.: 941,204

[22] Filed: Dec. 12, 1986

[51] Int. Cl.$^4$ .......................................... H01M 10/44
[52] U.S. Cl. ...................................... 204/21; 204/252
[58] Field of Search ................................ 204/2.1, 252

[56] References Cited

U.S. PATENT DOCUMENTS 4,269,907  5/1981  Momyer et al. ................. 429/67

Primary Examiner—T. M. Tufariello
Attorney, Agent, or Firm—Wood, Dalton, Phillips, Mason & Rowe

[57] ABSTRACT

A system and a method useful in the formation of electrodes for use in electrochemical cells are disclosed. The system includes a pair of conductive end electrodes spaced apart from one another and situated in an aqueous electrolyte. A pair of precursor electrodes are placed in the electrolyte, between the end electrodes. Each of these precursor electrodes comprise a material to be selectively reduced or oxidized disposed on a conductive substrate. The precursor electrodes are in a configuration substantially precluding contact between the electrolyte and the substrates thereof. The end electrodes and the precursor electrodes are in electrical contact with a power supply to effect a current flow in the electrolyte thereby reducing or oxidizing the material of the precursor electrodes. Restraining forces are applied to the precursor electrodes to substantially maintain the dimensions thereof during the electrode charging process. The system includes a separator effective in permitting the electrolyte to contact the precursor sand terminal electrodes, while permitting substantially uniform application of restraining forces to the precursor electrodes. The system can also include a semi-permeable membrane situated between the end electrodes and the precursor electrodes. The semi-permeable membrane is effective in preventing migration of the material to be reduced or ozidized from the precursor electrodes to the end electrodes, while permitting ionic charge transport therebetween.

44 Claims, 2 Drawing Figures

BIPOLAR ELECTRODE FORMATION

BACKGROUND OF THE INVENTION

1. Field of the Invention

This invention relates generally to electrochemical cells and, more particularly, this invention relates to bipolar electrodes and methods of formation thereof.

2. Description of Related Art

Electrochemical cells utilizing bipolar electrode designs having reactive metal electrodes supported on substrate current collectors are well known. See, for example, Momyer et al, U.S. Pat. No. 4,269,907 (May 26, 1981), the disclosure of which is hereby incorporated by reference, wherein cells including an aqueous electrolyte, an anode of an alkali metal, such as lithium, for example, a cathode spaced from the anode, and an intercell electrical connector are disclosed. In such cells, the cathode may comprise an electrochemically active material, such as silver oxide, and the electrolyte may comprise an aqueous alkaline solution.

Momyer et al also disclose an electrochemical cell stack comprising a plurality of bipolar electrodes connected in series.

The preparation of bipolar electrodes wherein a cathode and an anode are disposed on opposite sides of an electrically conductive metallic substrate typically involves the oxidation or reduction (charging) of a precursor electrode material. For example, the preparation of a bipolar electrode with a cathode of silver oxide typically involves oxidation of elemental silver. Generally, the elemental silver of such precursor electrodes in sintered and then hot forged onto a substrate current collector. Nickel foil plated with silver, so as to facilitate adherence of elemental silver thereto, is commonly used as a substrate current collector for such bipolar electrodes.

In the oxidation of these precursor battery electrodes, the hot forgings of elemental silver are assembled into a stack in which the elemental silver and counter electrodes of nickel foil are alternated, with the elemental silver electrodes in the charging stack electrically connected in parallel to attachment to the positive post of a DC power supply. Further, all the nickel foil substrates of the counter electrodes are electrically connected in parallel for attachment to the negative post of the DC power supply. The stack is then placed into an electrolyte solution which permits the electrical contact between the precursor electrodes and the counter electrode that is necessary for the reduction or oxidation of the material of the precursor electrodes.

In principle, no precursor electrode will exhibit a voltage rise independent of the other precursor electrodes because each of the precursor electrodes is made electrically common. Thus, when one of the precursor electrodes completes oxidation prior to the others, then even an infinitesimal increase in voltage produces an increased back electromotive force (EMF) which results in a drop-off in current through the already oxidized electrode and an altering of the current path through the other electrodes and thus a different current sharing pattern in these other electrodes.

In addition, the conventional electrode formation technique of parallel oxidation is frequently accompanied by undesirable bending of the electrodes. For example, the silver oxide electrodes resulting from the use of the above-identified method of oxidation are frequently of a bent, irregular shape. This bending of the electrodes is believed to be largely a result of the stoichiometric and molar volume changes which occur during electrode formation upon oxidation of the electroactive material while the substrate is unchanged and is commonly referred to as "potato chipping".

In practice, the oxidation of silver occurs in two steps. The first step may be represented by the following equation:

$$2Ag + 2OH^- \rightarrow Ag_2O + H_2O + 2e^- \tag{1}$$

Reaction (1) occurs at a standard reduction/oxidation potential of about 0.34 V which is below the voltage at which oxygen evolution will occur, i.e., the standard redox potential of oxygen is about 0.401 volt.

Once produced, $Ag_2O$ can be oxidized to the divalent level as shown by the following equation:

$$Ag_2O + 2OH^- \rightarrow 2AgO + H_2O + 2e^- \tag{2A}$$

Alternatively, elemental silver can be directly oxidized to the divalent level as shown by equation 2B:

$$Ag + 2OH^- \rightarrow AgO + H_2O + 2e^- \tag{2B}$$

Reactions (2A) and (2B) occur at potentials above 0.49 V and consequently above the redox potential of oxygen evolution. Thus, for the oxidation of silver to the divalent level, the release of oxygen at the nickel/electrolyte interface is thermodynamically favored and the efficiency of the oxidation process represented by the above equations is correspondingly decreased. Consequently, the use of this process of oxidation for bipolar electrodes generally results in electrodes having low and/or variable utilization of the active material therein and thus in electrodes of reduced capacity.

Commonly, the electrolyte used in electrode formation systems is circulated so as to minimize the likelihood of the formation of colloidal silver short circuits during the electrode formation process. The formation of colloidal silver short circuits, however, is a stochastic process and colloidal silver short circuits may be formed even when a flowing electrolyte is used.

SUMMARY OF THE INVENTION

It is an object of the present invention to overcome one or more of the problems described above.

According to the invention, a system useful in the formation of electrodes for use in electrochemical cells comprises a power supply and a pair of conductive end electrodes spaced apart from one another with a pair of precursor electrodes positioned therebetween. During operation of the system, each of the end electrodes and precursor electrodes is situated in an aqueous electrolyte through which a flow of ionic current is obtained. The precursor electrodes each comprise a material to be reduced or oxidized disposed on a conductive substrate and are in a configuration substantially precluding contact between the electrolyte and the substrates. In addition, the system includes restraining means for applying restraining forces to the precursor electrodes which substantially maintain the dimensions thereof during reduction or oxidation. Separators are disposed between the precursor electrodes and the end electrodes and are generally effective in permitting the precursor electrodes and the end electrodes to come in contact with the electrolyte while permitting a substantially uniform application of the restraining forces to the precursor electrodes.

Preferably, the system includes a semi-permeable membrane situated between the end electrodes and the precursor electrodes. The semi-permeable membrane is effective in preventing migration of the material to be reduced or oxidized from the precursor electrodes to the end electrodes, while permitting ionic charge transport therebetween.

In addition to the above-described system, the invention comprehends methods of reduction or oxidation useful in the formation of electrodes for use in electrochemical cells.

Other objects and advantages of the invention will be apparent to those skilled in the art from the following detailed description, taken in conjunction with the drawings and the appended claims.

DETAILED DESCRIPTION OF THE INVENTION

Figure 1:
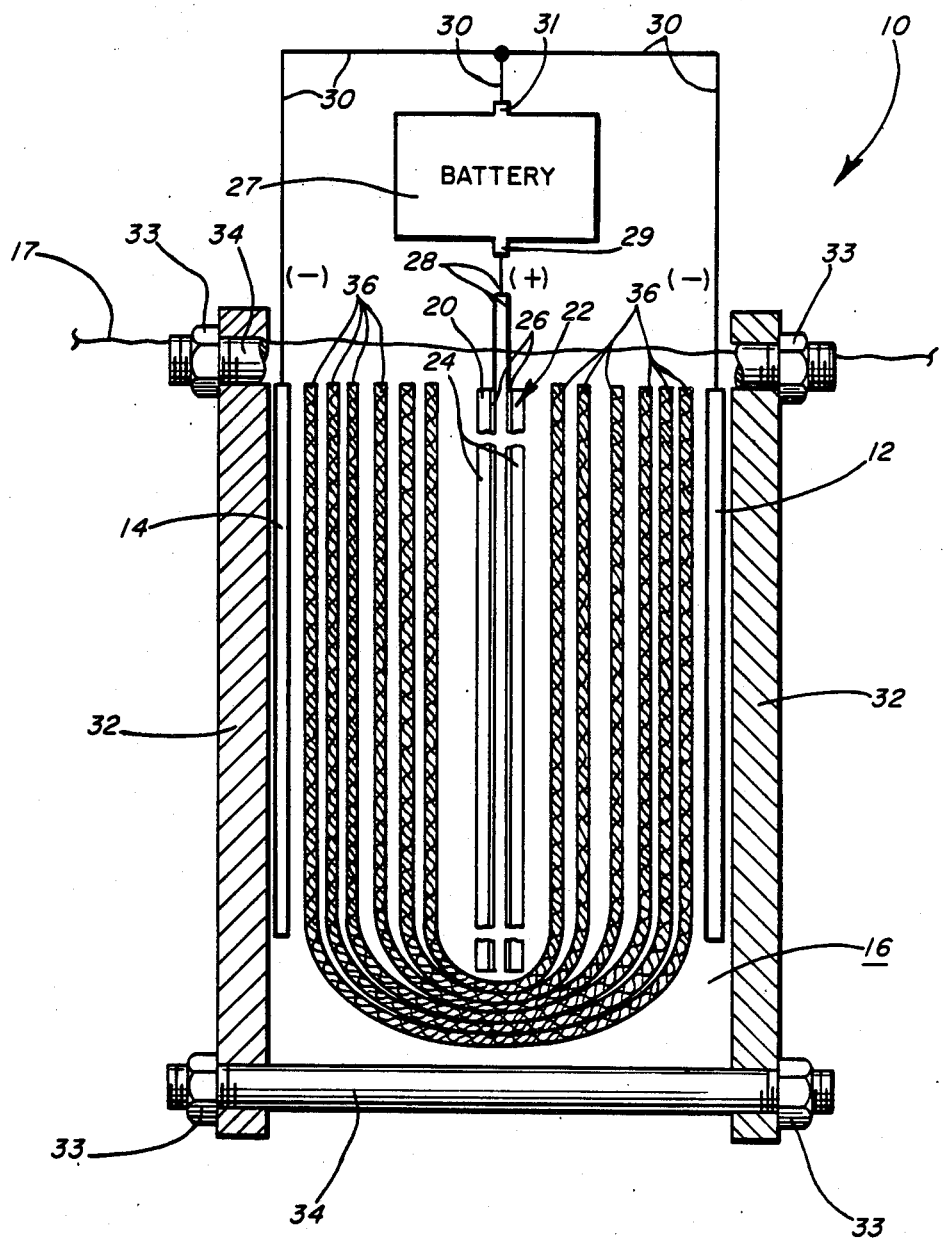
FIG. 1 is a partially exploded, fragmentary, simplified schematic view of a system for the formation of bipolar electrodes according to a typical embodiment of the present invention.

Referring to FIG. 1, a system 10 useful in the formation of electrodes for use in electrochemical cells is shown. The system, generally designated 10, includes a pair of conductive end or counter electrodes 12 and 14 spaced apart from one another and disposed in an aqueous electrolyte 16 during operation of the system 10. The entire system 10 is placed in a bath (not shown) of aqueous electrolyte 16 with the level of electrolyte represented by the line 17.

In the illustrated embodiment for the oxidation of elemental silver, the end electrodes 12 and 14 are made of nickel foil and the electrolyte 16 may be an aqueous solution of the hydroxide of an alkali metal, e.g., NaOH, KOH or LiOH, with KOH being preferred and KOH of a concentration of about 30-45 wt % being especially preferred. It is to be understood that for the oxidation or reduction of other materials, different electrolytes and/or different concentrations of electrolyte may be preferred. However, selection of specific electrolytes and concentrations will be within the skill of those in the art, guided by the teachings herein.

A pair of precursor electrodes 20 and 22, each comprising an electroactive material 24 disposed on a conductive substrate 26, are situated in the aqueous electrolyte 16 between the end electrodes 12 and 14. It is to be understood that the electroactive material 24 is, depending on its nature, to be reduced or oxidized. For example, for the formation of silver oxide electrodes, each of the illustrated precursor electrodes 20 and 22 comprises porous elemental silver as the material 24 bonded to a bi-metal silver clad nickel foil substrate 26. The nickel foil substrate 26 is plated with silver so as to facilitate adherence of elemental silver thereto.

The efficiency of the oxidation/reduction process is increased by minimizing and/or eliminating the areas of the substrates 26 that are in direct mechanical contact with the aqueous electrolyte 16, i.e., decreasing or eliminating the substrate/electrolyte interface at which, as described above, the release of oxygen is thermodynamically favored. The process of the invention results in the production of electrodes having a higher, more uniform charge capacity.

To minimize the surface area of the substrate/electrolyte interface, the precursor electrodes 20 and 22 are placed in register and in a configuration wherein the substrate 26 of the first precursor electrode 20 is aligned and in contact with the substrate 26 of the second precursor electrode 22. This positioning of the precursor electrodes 20 and 22 substantially precludes contact between the electrolyte 16 and the substrates 26 of the precursor electrodes 20 and 22, and thereby increases the efficiency of the reduction/oxidation process.

As a result of the increased efficiency of the reduction/oxidation process, relatively less power is required by the system to effect a reduction/oxidation of a given magnitude of a precursor electrode material, such as silver, as generally compared to prior processes. The decreased power requirements of the system can be realized through several means such as:

(1) reducing the charge time of the precursor electrode while maintaining the same current density, (2) reducing the current density while maintaining the charge time, or (3) reducing both the current density and the charge time.

In practice, reductions in the charge time result in economic savings realized through a reduction in the volume of electrolyte required to be flowed through the system to minimize the formation of colloidal silver, reductions in the power and energy requirements of the system and, perhaps most significantly, a reduction in the rejection rate of unacceptable electrodes.

The end electrodes 12 and 14 and the substrates 26 of the precursor electrodes 20 and 22 are in electrical contact with a power supply such as a battery 27 so as to effect ionic current flow in the aqueous electrolyte 16 whereby the material 24 of the precursor electrodes 20 and 22 is reduced or oxidized. For example, in the illustrated embodiment, wherein oxidation of the elemental silver of the precursor electrodes 20 and 22 is sought, the charge flow in the electrolyte 16 is generally away from the end electrodes 12 and 14 and toward the precursor electrodes 20 and 22, i.e., toward the substrates 26. The electrical wiring 28 connects the substrates 26 with the positive terminal 29 of the battery 27 (the end electrodes 12 and 14 are connected by the electrical wiring 30 with the negative terminal 31 of the battery 27).

In addition, a restraining means such as restraining plates 32 and restraining nuts 33 and bolts 34 are included in system 10. The restraining plates 32, nuts 33 and bolts 34 serve to apply restraining forces to the previously described configuration of the end electrodes 12 and 14 and the precursor electrodes 20 and 22. These restraining forces substantially maintain the dimensions of the precursor electrodes 20 and 22 notwithstanding the volumetric changes in the material 24 attendant the reduction or oxidation thereof.

In addition, the restraining forces as applied to precursor electrodes disposed in the above-described back-to-back configuration, wherein the substrate is generally planar with the material to be reduced or oxidized forming a layer disposed on one planar side of the substrate, serve to maintain direct contact between the substrates 26 of the precursor electrodes 20 and 22. Thus, the restraining forces serve to further reduce and minimize the possibility of electrolyte seeping between the precursor electrodes 20 and 22 and coming into direct contact with either of the substrates 26. However, it is to be understood that these restraining forces are not of a magnitude sufficient to harm or destroy the structure of the material 24 to be reduced or oxidized. For example, in the practice of the invention, in the formation of silver oxide electrodes, a tension of about 40 inch pounds has been found to be effective to maintain the substrates of the precursor electrodes in direct contact without harming the structure of the elemental silver of the precursor electrodes.

Disposed between the precursor electrodes 20 and 22 and the end electrodes 12 and 14 is a wetting or wicking separator material 36 which permits the aqueous electrolyte 16 to come in contact with the material 24 of each of the precursor electrodes 20 and 22. Also, the separator material 36 is in an amount effective to allow the restraining forces produced by the action of the restraining plates 32 in conjunction with the nuts 33 and the bolts 34 to be substantially uniformly applied to the precursor electrodes 20 and 22. For example, a plastic screen material exemplified by "VEXAR" (a trademark of E. I. DuPont de Nemours and Co. for a polypropylene plastic screen material) has effectively been used as the separator 36. The solid plastic parts of the "VEXAR" plastic screen transmit the mechanical force being applied thereto while the openings in the screen permit the electrolyte to come in contact with the material 24 of the precursor electrode 20 and 22.

By effecting ionic charge flow through the aqueous electrolyte 16 in the above-described system 10, electrodes having desired degrees of flatness, integrity, weight gain, color uniformity, thickness and density uniformity are formed. Furthermore, the rejection rate of electrodes so formed is reduced.

Figure 2:
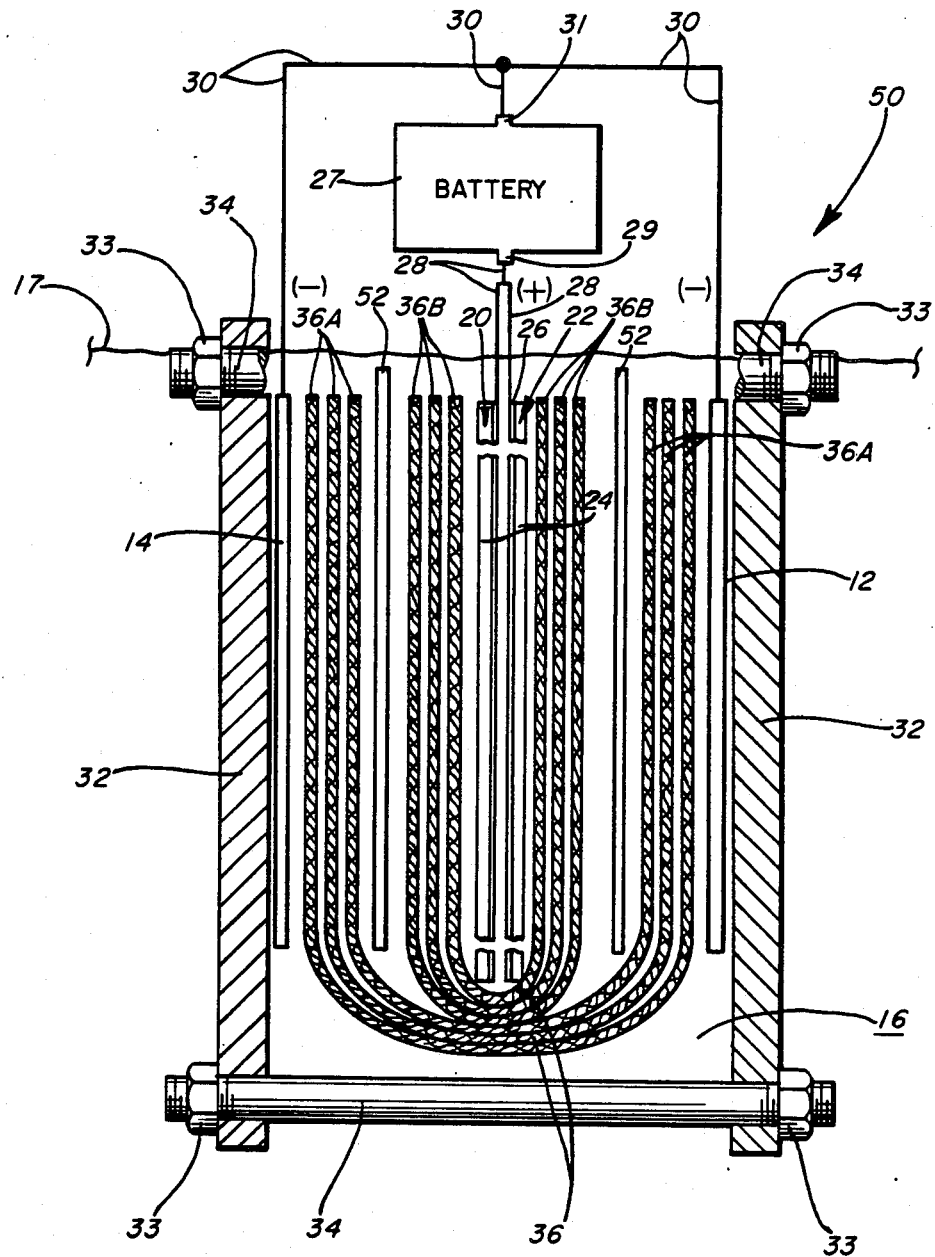
FIG. 2 is a partially exploded fragmentary view of a simplified schematic of a system for the formation of electrodes according to an alternative embodiment of the present invention.

Referring now to FIG. 2, a preferred embodiment of the present invention is shown. A system, generally designated 50, similar to the system 10 of FIG. 1 is shown. The system 50 includes components such as a pair of conductive end electrodes 12 and 14, a pair of precursor electrodes 20 and 22, a power supply 27, restraining plates 32, an effective amount of a wetting or wicking separator material 36 and associated connections. The system 50, however, includes a semi-permeable membrane 52 disposed between each of the end electrodes 12 and 14 and the precursor electrodes 20 and 22. The wicking separator, designated 36A and 36B, respectively, is disposed between the membrane 52 and each of the end electrodes 12 and 14 and the membrane 52 and each of the precursor electrodes 20 and 22. It is to be understood, however, that other membrane/separator/electrode configurations will be within the skill of those in the art, guided by the teachings herein.

The membrane 52 is effective in preventing migration of the material 24 to be reduced or oxidized, from the precursor electrodes 20 and 22 to the end electrodes 12 and 14, while permitting ionic charge transport therebetween. Semi-permeable membrane materials effective in preventing migration of silver include cellophane (manufactured by DuPont), silver treated cellophane, referred to as C19, available from Yardney Electric Co. or the preferred fibrous sausage casing (designated FSC) sold by Union Carbide Corp.

In practice, prior to the initiation of a run, the C19 or other cellulose base separators are allowed to absorb the electrolyte to facilitate the transport of ionic charge therethrough during operation of the system.

EXAMPLES

The following examples illustrate the practice of the present invention. It is understood that all changes and modifications that come within the spirit of the invention are desired to be protected and thus the invention is not to be construed as limited by these examples.

EXAMPLE 1

Two sets of back-to-back 11 inch diameter silver bipolar precursor electroplates were placed in an aqueous solution of potassium hydroxide (about 35 wt % potassium hydroxide) as shown in FIG. 1. The plates were placed in register so as to minimize the nickel-/electrolyte interfacial area. A separator of "VEXAR" polypropylene screen material is placed about the outer silver surfaces of the precursor electrodes. Restraining plates are placed on either side of the pair of back-to-back precursor electrodes and tightened to finger tightness (on the order of 5 inch pounds of torque) so as to maintain the dimensions of the electrode during charge and to maintain the metal to metal contact of each of the precursor electrode pairs.

With the above-described apparatus, the charge rate was decreased to 1.8A per plate from the previously used value of 2.15A per plate. In addition, the charge time was decreased from 60 hours to 43 hours and the voltage at the end of charge was about 1.7 volts instead of 1.9+ volts per cell. Further, no plates were rejected whereas previous runs, not utilizing the method of the present invention, resulted in rejection rates of between 50 and 100%.

EXAMPLE 2

For this example, a system for electrode formation was utilized having the following configuration, from left to right:
(1) a nickel counter electrode
(2) "VEXAR" polypropylene screening material
(3) C19 semi-permeable membrane material
(4) 4 layers of "VEXAR" polypropylene screening material
(5) back-to-back silver precursor electrodes
(6) 4 layers of "VEXAR" polypropylene screening material
(7) C19 semi-permeable membrane material
(8) "VEXAR" polypropylene screening material and
(9) a second nickel counter electrode.

Restraining plates were placed on either side of this arrangement to maintain the above-described system under a tension of 10, and later 40, inch pounds. The system was then placed in a tank of aqueous potassium hydroxide electrolyte (about 35 wt % potassium hydroxide) and allowed to equilibrate with the electrolyte. (C19 and other cellulose separators require a period of time to imbibe the electrolyte.)

Charging was begun and as of 63 hours later, no colloidal short circuits had occurred. Further, both the voltage levels and break point were similar to previous runs which used thicker plates but no semi-permeable membrane.

The foregoing detailed description is given for clearness of understanding only, and no unnecessary limitations should be understood therefrom, as modifications within the scope of the invention will be obvious to those skilled in the art.

I claim:

1. A system useful in the formation of electrodes for use in electrochemical cells, said system comprising:
   a power supply;
   a pair of conductive end electrodes spaced apart from one another and disposed in an aqueous electrolyte during operation of said system, said end electrodes being in electrical contact with said power supply to effect current flow in said electrolyte;
   a pair of precursor electrodes each comprising an electroactive material to be reduced or oxidized disposed on a conductive substrate, said precursor electrodes being disposed in said electrolyte in a configuration substantially precluding contact between said electrolyte and said substrates and orientated relative to said end electrodes so as to permit said reduction or oxidation of said material, said substrates being in electrical contact with said power supply to effect current flow in said electrolyte;
   restraining means for applying restraining forces to said precursor electrodes substantially maintaining the dimensions of said precursor electrodes during said reduction or oxidation; and,
   a separator disposed between said precursor electrodes and said end electrodes permitting said precursor electrodes and said end electrodes to contact said electrolyte and permitting a substantially uniform application of said restraining forces to said precursor electrodes.

2. The system of claim 1 wherein said substrates are generally planar and said material to be reduced or oxidized comprises a layer of generally uniform thickness disposed on one planar side of said substrate, and said restraining forces are sufficient to maintain said substrate of the first of said precursor electrodes in direct contact with said substrate of the second of said precursor electrodes and insufficient to impair the structure of said material to be reduced or oxidized.

3. The system of claim 2 wherein said pair of precursor electrodes are in register.

4. The system of claim 1 wherein said material to be oxidized comprises elemental silver.

5. The system of claim 4 wherein said substrate comprises nickel foil.

6. The system of claim 1 wherein said electrolyte comprises a hydroxide of an alkali metal.

7. The system of claim 6 wherein said electrolyte is selected from the group consisting of NaOH, KOH and LiOH.

8. The system of claim 1 wherein said separator comprises a rigid, non-conductive porous member.

9. The system of claim 8 wherein said rigid porous member comprises a plastic screen.

10. The system of claim 9 wherein said plastic comprises polypropylene.

11. A system useful in the formation of electrodes for use in electrochemical cells, said system comprising:
    a power supply;
    a pair of conductive end electrodes spaced apart from one another and disposed in an aqueous electrolyte during operation of said system, said end electrodes being in electrical contact with said power supply to effect current flow in said electrolyte;
    a pair of precursor electrodes each comprising an electroactive material to be reduced or oxidized disposed on a conductive substrate, said precursor electrodes being disposed in said electrolyte in a configuration substantially precluding contact between said electrolyte and said substrates and orientated relative to said end electrodes so as to permit said reduction or oxidation of said material, said substrates being in electrical contact with said power supply to effect current flow in said electrolyte;
    restraining means for applying restraining forces to said precursor electrodes substantially maintaining the dimensions of said precursor electrodes during said reduction or oxidation;
    a separator disposed between said precursor electrodes and said end electrodes permitting said precursor electrodes and said end electrodes to contact said electrolyte and permitting a substantially uniform application of said restraining forces to said precursor electrodes; and,
    a semi-permeable membrane disposed between each of said end electrodes and said precursor electrodes effective in preventing migration of said material to be reduced or oxidized while permitting ionic charge transport therethrough.

12. The system of claim 11 wherein said substrates are generally planar and said material to be reduced or oxidized comprises a layer of generally uniform thickness disposed on one planar side of said substrate, and said restraining forces are sufficient to maintain said substrate of the first of said precursor electrodes in direct contact with said substrate of the second of said precursor electrodes and insufficient to impair the structure of said material to be reduced or oxidized.

13. The system of claim 12 wherein said pair of precursor electrodes are in register.

14. The system of claim 11 wherein said material to be oxidized comprises elemental silver.

15. The system of claim 14 wherein said substrate comprises nickel foil.

16. The system of claim 11 wherein said electrolyte comprises a hydroxide of an alkali metal.

17. The system of claim 16 wherein said electrolyte is selected from the group consisting of NaOH, KOH and LiOH.

18. The system of claim 11 wherein said separator comprises a rigid, non-conductive porous member.

19. The system of claim 18 wherein said rigid porous member comprises a plastic screen.

20. The system of claim 19 wherein said plastic comprises polypropylene.

21. The system of claim 11 wherein said separator is disposed between said membrane and each of said end electrodes and between said membrane and each of said precursor electrodes.

22. The system of claim 11 wherein said material to be oxidized comprises elemental silver and said semi-permeable membrane comprises a material selected from the group consisting of cellophane, silver treated cellophane and fibrous sausage casing.

23. A method of reduction/oxidation useful in electrode formation for use in the electrochemical cells, comprising the steps of:
    (a) providing a system comprising;
    a power supply;
    a pair of conductive end electrodes spaced apart from one another and disposed in an aqueous electrolyte during operation of said system, said end electrodes being in electrical contact with said power supply to effect current flow in said electrolyte;
    a pair of precursor electrodes each comprising an electroactive material to be reduced or oxidized disposed on a conductive substrate, said precursor electrodes being disposed in said electrolyte in a configuration substantially precluding contact between said electrolyte and said substrates and orientated relative to said end electrodes so as to permit said reduction or oxidation of said material, said substrates being in electrical contact with said power supply to effect current flow in said electrolyte; and a separator disposed between said precursor electrodes and said end electrodes permitting said precursor electrodes and said end electrodes to contact said electrolyte and permitting a substantially uniform application of said restraining forces to said precursor electrodes;

(b) applying restraining forces to said precursor electrodes to substantially maintain the dimensions of said precursor electrodes during said reduction or oxidation; and, (c) effecting current flow through said aqueous electrolyte of said system to reduce or oxidize said material of said precursor electrodes.

24. The method of claim 23 wherein said substrates of said precursor electrodes are generally planar and said material to be reduced or oxidized comprises a generally uniform layer disposed on one planar side of said substrate, and said restraining forces are sufficient to maintain said substrate of the first of said precursor electrodes in direct contact with said substrate of the second of said precursor electrodes and insufficient to impair the structure of said material to be reduced or oxidized.

25. The method of claim 23 wherein said pair of precursor electrodes are in register.

26. The method of claim 23 wherein said material to be oxidized comprises elemental silver.

27. The method of claim 26 wherein said substrate comprises nickel foil.

28. The method of claim 23 wherein said electrolyte comprises a hydroxide of an alkali metal.

29. The method of claim 28 wherein said electrolyte is selected from the group consisting of NaOH, KOH and LiOH.

30. The method of claim 23 wherein said separator comprises a rigid, non-conductive porous member.

31. The method of claim 30 wherein said rigid porous member comprises a plastic screen.

32. The method of claim 31 wherein said plastic comprises polypropylene.

33. A method of reduction/oxidation useful in electrode formation for use in the electrochemical cells, comprising the steps of:

(a) providing a system comprising;

a power supply;

a pair of conductive end electrodes spaced apart from one another and disposed in an aqueous electrolyte during operation of said system, said end electrodes being in electrical contact with said power supply to effect current flow in said electrolyte;

a pair of precursor electrodes each comprising an electroactive material to be reduced or oxidized disposed on a conductive substrate, said precursor electrodes being disposed in said electrolyte in a configuration substantially precluding contact between said electrolyte and said substrates and orientated relative to said end electrodes so as to permit said reduction or oxidation of said material, said substrates being in electrical contact with said power supply to effect current flow in said electrolyte;

a separator disposed between said precursor electrodes and said end electrodes permitting said precursor electrodes and said end electrodes to contact said electrolyte and permitting a substantially uniform application of said restraining forces to said precursor electrodes; and, a semi-permeable membrane disposed between said end electrodes and said precursor electrodes effective in preventing migration of said material to be reduced or oxidized while permitting ionic charge transport therethrough;

(b) applying restraining forces to said precursor electrodes to substantially maintain the dimensions of said precursor electrodes during said reduction or oxidation; and, (c) effecting current flow through said aqueous electrolyte of said system to reduce or oxidize said material of said precursor electrodes.

34. The method of claim 33 wherein said substrates of said precursor electrodes are generally planar and said material to be reduced or oxidized comprises a generally uniform layer disposed on one planar side of said substrate, and said restraining forces are sufficient to maintain said substrate of the first of said precursor electrodes in direct contact with said substrate of the second of said precursor electrodes and insufficient to impair the structure of said material to be reduced or oxidized.

35. The method of claim 33 wherein said pair of precursor electrodes are in register.

36. The method of claim 33 wherein said material to be oxidized comprises elemental silver.

37. The method of claim 36 wherein said substrate comprises nickel foil.

38. The method of claim 33 wherein said electrolyte comprises a hydroxide of an alkali metal.

39. The method of claim 38 wherein said electrolyte is selected from the group consisting of NaOH, KOH and LiOH.

40. The method of claim 33 wherein said separator comprises a rigid, non-conductive porous member.

41. The method of claim 40 wherein said rigid porous member comprises a plastic screen.

42. The method of claim 41 wherein said plastic comprises polypropylene.

43. The method of claim 33 wherein said separator is disposed between said membrane and each of said end electrodes and between said membrane and each of said precursor electrodes.

44. The method of claim 33 wherein said material to be oxidized comprises elemental silver and said semi-permeable membrane comprises a material selected from the group consisting of cellophane, silver treated cellophane and fibrous sausage casing.

* * * * *